(12) United States Patent
Sun et al.

(10) Patent No.: US 10,581,971 B2
(45) Date of Patent: Mar. 3, 2020

(54) METHOD, APPARATUS AND SYSTEM FOR EXCHANGING SENSOR INFORMATION WITH MIDDLEWARE

(71) Applicant: Intel Corporation, Santa Clara, CA (US)

(72) Inventors: Yao Sun, Beijing (CN); Ping Huang, Shanghai (CN); Guanghao Wang, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 363 days.

(21) Appl. No.: 15/127,741

(22) PCT Filed: Jul. 2, 2014

(86) PCT No.: PCT/CN2014/081499
§ 371 (c)(1),
(2) Date: Sep. 20, 2016

(87) PCT Pub. No.: WO2016/000225
PCT Pub. Date: Jan. 7, 2016

(65) Prior Publication Data
US 2017/0163735 A1 Jun. 8, 2017

(51) Int. Cl.
*H04L 29/08* (2006.01)
*G06F 13/12* (2006.01)
*H04L 12/26* (2006.01)

(52) U.S. Cl.
CPC ............ *H04L 67/12* (2013.01); *G06F 13/122* (2013.01); *H04L 29/08558* (2013.01);
(Continued)

(58) Field of Classification Search
CPC .... G05B 11/42; G05B 15/02; G05B 23/0221; H04L 41/0809–0893; H04L 43/16;
(Continued)

(56) References Cited

U.S. PATENT DOCUMENTS

2008/0052757 A1* 2/2008 Gulati ................. H04L 41/0809
726/1
2008/0082180 A1* 4/2008 Blevins ................. G05B 11/42
700/29
(Continued)

FOREIGN PATENT DOCUMENTS

CN 101146129 3/2008
CN 102547965 7/2012
(Continued)

OTHER PUBLICATIONS

English-translation of CN101146129 by Wu (Year: 2008).*
(Continued)

*Primary Examiner* — Brendan Y Higa
(74) *Attorney, Agent, or Firm* — Womble Bond Dickinson (US) LLP

(57) ABSTRACT

Techniques and mechanisms for communicating sensor information between devices with middleware. In an embodiment, middleware logic executing at a computer platform receives sensor data generated based on operation of a sensor device of the platform. Any process participating in an exchange of the sensor data between a sensor driver process and the middleware logic is a process other than a process of any user application of the platform. Processing of the sensor data includes the middleware logic generating a data packet including information based on the sensor data. In another embodiment, the data packet is transmitted from the platform to another platform, where middleware of the other platform receives and processes the data packet independent of some or all user applications executing at the other platform.

24 Claims, 6 Drawing Sheets

(52) U.S. Cl.
CPC .............. *H04L 43/08* (2013.01); *H04L 67/10* (2013.01); *H04L 67/2823* (2013.01)

(58) Field of Classification Search
CPC ......... H04L 67/10–141; H04L 67/2805–2823; H04L 12/2803; H04L 12/2823; H04L 29/08558; H04L 43/065–67; H04W 52/0254–0274; H04W 76/14; H04W 4/70–80; H04W 8/005; H04W 48/16; H04W 4/38; A61B 5/0015; G06F 11/1482
See application file for complete search history.

(56) References Cited

U.S. PATENT DOCUMENTS

| | | | |
|---|---|---|---|
| 2009/0284376 A1 | 11/2009 | Byun et al. | |
| 2014/0005809 A1* | 1/2014 | Frei | H04L 51/38 700/90 |
| 2014/0121557 A1* | 5/2014 | Gannon | A61B 5/002 600/549 |
| 2015/0036573 A1* | 2/2015 | Malik | H04W 52/0254 370/311 |
| 2016/0029148 A1* | 1/2016 | Jackson | H04W 76/14 455/41.2 |

FOREIGN PATENT DOCUMENTS

| | | |
|---|---|---|
| CN | 103067475 | 4/2013 |
| CN | 103415052 | 11/2013 |

OTHER PUBLICATIONS

"International Search Report and Written Opinion of the International Searching Authority dated Apr. 3, 2015, in International Patent Application No. PCT/CN2014/081499, 10 pages".
International Preliminary Report on Patentability for International Patent Application No. PCT/CN2014/081499 dated Jan. 12, 2017, 6 pgs.

* cited by examiner

METHOD, APPARATUS AND SYSTEM FOR EXCHANGING SENSOR INFORMATION WITH MIDDLEWARE

CLAIM OF PRIORITY

This application is a U.S. National Phase application under 35 U.S.C. § 371 of International Application No. PCT/CN2014/081499, filed Jul. 2, 2014, entitled "METHOD, APPARATUS AND SYSTEM FOR EXCHANGING SENSOR INFORMATION WITH MIDDLEWARE," the entire contents of which are incorporated herein by reference.

BACKGROUND

1. Technical Field

Embodiments pertain to operations in mobile and fixed-location computing systems and devices. Some embodiments relate to exchanging sensor information between multiple systems and devices.

2. Background Art

Many people interact with more than one computing device each day. Some of these devices are stationary or positioned at fixed locations, including desktop computers, workstations, personal data servers, and smart televisions. Some of these devices are mobile, including cellular telephones, tablet computers, Ultrabook computers, laptop computers, and music players.

Some of these platforms include any of various motion (or other) sensor mechanisms. However, due their size and weight, relatively stationary computer platforms, and even some relatively large mobile platforms, are not easy to rotate or linearly move to exploit motion sensor functionality. Still other platforms may lack motion sensor functionality altogether. Nevertheless, there is a growing trend of users wanting to use motion sensing for interfacing with applications which run on such platforms.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously provide techniques and/or mechanisms to automate communication of sensor information between devices independent of some or all application layer processing. Such automated communication of sensor information, referred to herein as sensor tethering, may extend sensor usage across different platforms.

In an embodiment, sensor tethering middleware is made available for use by one or more applications—e.g. as a framework accessible via an application programming interface (API) to facilitate collaboration for sharing a sensor capability between different types of devices, such as a smartphone and a laptop. The Common Connectivity Framework (CCF) from Intel® Corporation, Santa Clara, Calif., for example, provides some automation of proximity detection, device discovery, device connection, data transmission and inter-platform connection management. However, there is currently no common sensor tethering framework for application developers to exploit. The sensor processing middleware of various embodiments implements a framework for application-independent, run-time communication of sensor information which is reliable and bandwidth efficient. Such a framework may be made available on various platforms—e.g. including Android™, Windows® or other such platforms—and/or across various processor (or other hardware) configurations.

Figure 1:
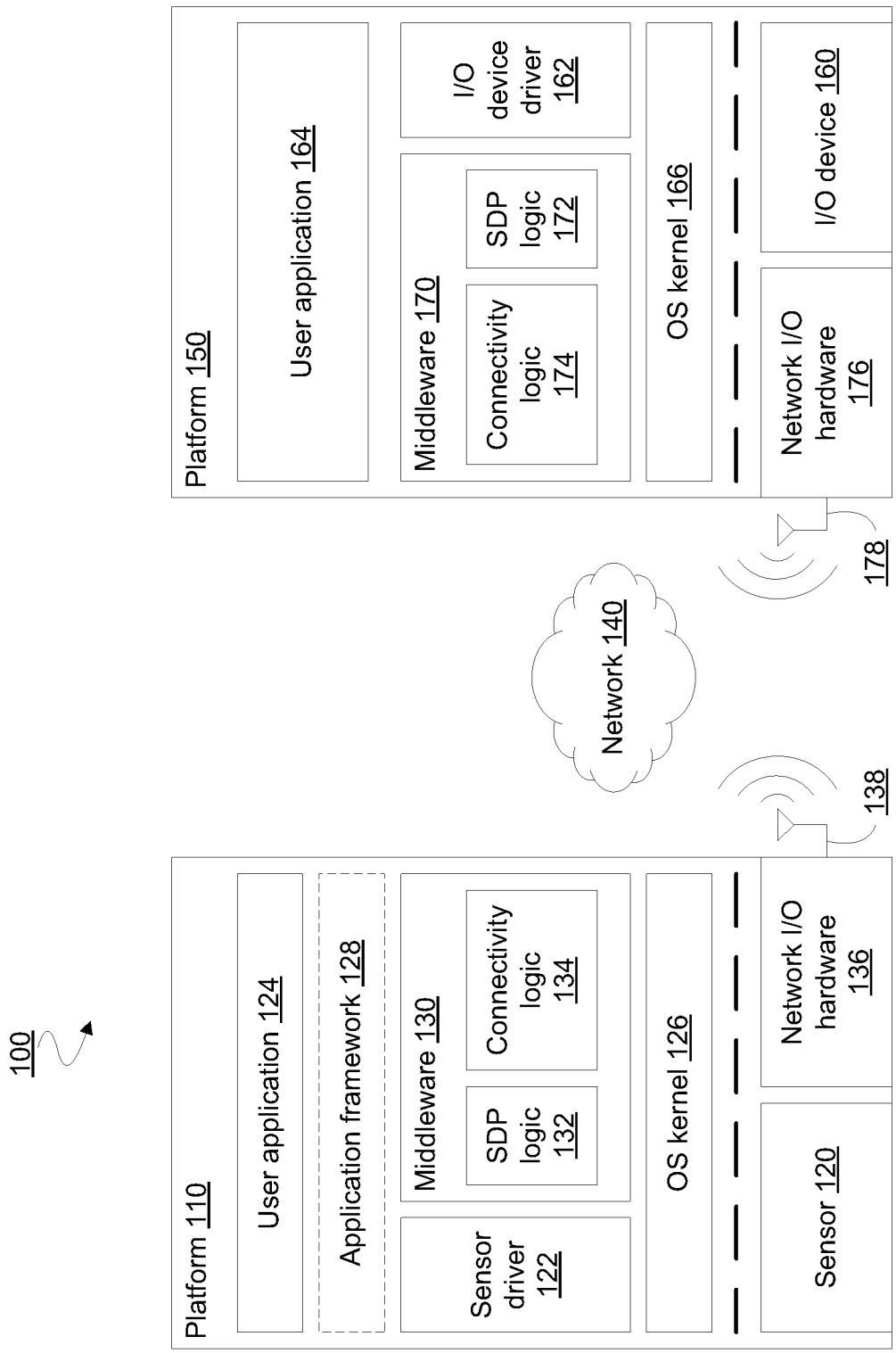
FIG. 1 is a functional block diagram illustrating elements of a system for communicating sensor data according to an embodiment.

FIG. 1 illustrates elements of a system 100 for exchanging sensor data according to an embodiment. System 100 may include a first platform 110 and a second platform 150 coupled to one another via a network—e.g. as represented by the illustrative wireless network 140 shown. Platform 110 (and similarly, platform 150) represents any of a number of computing systems—e.g. including servers, desktops, laptops, mobile devices, smartphones, gaming devices, and others—which variously support sensor data processing and communication functionality as discussed herein. Network 140 represents any of a variety of one or more wireless networks and/or wired networks including, for example, a Wifi network, a local area network (LAN), a virtual LAN (VLAN), a wide area network (WAN), an Internet or the like. In certain embodiments, platforms 110, 150 may communicate directly with one another independent of any intermediary networking hardware.

Platform 110 may include a general-purpose processor and memory (not shown) and/or other hardware resources to execute a host operating system (OS) such as one comprising the illustrative OS kernel 126 shown. Such a host OS may comprise a Windows® OS from Microsoft Corporation of Redmond, Wash., an OS X® operating system from Apple Incorporated of Cupertino, Calif., an Android™ OS from Google, Incorporated of Mountain View, Calif., a Linux OS and/or the like. During runtime operation, platform 110 may implement a software stack including OS kernel 126, at a relatively low layer of the software stack, and one or more other processes variously executing at higher levels of the software stack. For example, one or more applications—as represented by the illustrative user application 124 shown—may execute at an application layer of the software stack. Although certain embodiments not limited in this regard, user application 124 may execute within an application framework 128 such as one implemented with an Android operating system.

Hardware of platform 110 may include one or more sensors—as represented by the illustrative sensor 120—which, for example, may detect a state of platform 110 and/or a state of an environment proximate to platform 110. For example, sensor 120 may comprise a gyroscope, linear accelerometer, or any of various other motion sensor devices known in the art. Alternatively or in addition, sensor 120 may include any of various other conventional hardware to sense pressure, light, heat, vibration or the like. In certain embodiments, such sensor hardware may be configured to directly or indirectly receive input from a user of platform 110. For example, sensor 120 may include one or more of a microphone, touchpad, touchscreen, camera or other such sensor device.

According to conventional techniques, information generated based on operation of sensor 120 would be provided to one or more processes executing at an application layer which is provided by OS kernel 126. For example, conventional techniques typically require such sensor information to be provided to an application such as user application 124 for processing prior to communication via network input/output (I/O) hardware 136 of platform 110. Although certain embodiments are not limited in this regard, network I/O hardware 136 may comprise a network card, wireless modem, and/or other such hardware to exchange—e.g. receive and/or transmit—information via an antenna 138.

By contrast, certain embodiments variously provide middleware—as represented by the illustrative middleware 130 of platform 110—which allows for the responsibility of processing at least some sensor data to be offloaded from the application layer. By way of illustration and not limitation, the software stack of platform 110 may include a driver process—as represented by the illustrative sensor driver 122—to drive operation of sensor 120 (and/or other sensor hardware). Depending on the particular software architecture of platform 110, sensor driver 122 may be part of the host OS or part of middleware 130, for example. However, certain embodiments or not limited with respect to a particular configuration of sensor driver 122 relative to other components of the software stack.

Operation of sensor 120 with sensor driver 122 may result in sensor data being exchanged from sensor driver 122 to logic of middleware 130 such as the illustrative sensor data processing (SDP) logic 132. The sensor data may include a value or values for one or more points, vectors, matrices and/or other data which represents a condition or conditions sensed with sensor 120. In an embodiment, any process participating in the exchange of the sensor data is a process other than any process of user application 124. For example, the sensor data may be exchanged between sensor driver 122 and SDP logic 132 independent of any process which is concurrently executing in the application layer of platform 110.

Functionally, middleware 130 may be considered to be between the host OS comprising OS kernel 126 and an application layer in which one or more applications such as user application 124 execute. Middleware 130 may comprise compiled code, libraries and/or other such software resources to be made available for providing sensor data processing (and/or other) functionality. The middleware 130 may provide a framework for one or more applications to be able to invoke such functionality, without each such application having to independently implement the functionality internally.

For example, user application 124 may access an application programming interface (API) of middleware 130 to configure sensor data processing by SDP logic 132. Although certain embodiments are not limited in this regard, user application 124 may include a graphical user interface (GUI) with which a user may request such configuration. Configuration of SDP logic 132 may be performed with an application which executes during a subsequent processing of sensor data via SDP logic 132. However, in another embodiment, the application which configures SDP logic 132 may not execute during the subsequent sensor data processing.

In an embodiment, configuring SDP logic 132 includes exchanging a command specifying that SDP logic 132 is to commence processing sensor data provided from sensor driver 122. Alternatively or in addition, configuring SDP logic 132 may include middleware 130 receiving signaling which defines or otherwise indicates one or more conditions which are to be evaluated by middleware 130—e.g. at some regular interval—to determine whether some future processing of such sensor data is to commence. For example, middleware 130 may include logic to automatically detect for the proximity of another platform to platform 110. One example of such logic is represented by the illustrative connectivity logic 134 of middleware 130. Connectivity logic 134 may provide functionality, such as that of Intel Corporation's CCF, to automatically detect for the presence of another platform—such as platform 150—and, in response, to connect platform 110 to that other platform. In such an embodiment, SDP logic 132 may be configured to automatically begin receiving and processing sensor data in response to detection of platform 150 (or other such proximate platform) by connectivity logic 134. However, certain embodiments are not limited with respect to particular conditions under which sensor data processing by SDP logic 132 is to commence.

In an embodiment, some or all sensor data from sensor driver 122 may be directed to SDP logic 132 in lieu of some application of platform 110 (e.g. any application) which, but for availability of SDP logic 132, might otherwise have to support processing of the sensor data. The processing of sensor data by SDP logic 132 may include a preliminary converting, formatting and/or other operations to modify the sensor data as output from sensor driver 122. For example, SDP logic 132 may packetize received sensor data values and/or other data which SDP logic 132 calculates based on such sensor data values. The resulting data packet may include a packet header and/or tail and a payload portion encapsulated by the header/tail. The packet header/tail may include metadata which, for example, is to indicate to platform 150 that the payload includes sensor data. Alternatively or in addition, such metadata may indicate a particular format of the sensor data, a particular type of sensor associated with the sensor data, a length of the payload and/or other such information.

Processing by SDP logic 132 may be distinguished, for example, from other processing which is to support communication of the resulting processed sensor data between platforms 110, 150. For example, a sensor data packet generated by SDP logic 132 may be subsequently provided to a communication protocol stack of platform 110 so that transmission of the sensor data packet to platform 150 may meet one or more requirements of a communication protocol. Although certain embodiments are not limited in this regard, the communication protocol may include any of various wireless communication protocols including, but not limited to, any of various 802.11 standards of the Institute of Electrical and Electronics Engineers (IEEE), those of the Mobile Industry Processor Interface (MIPI®) Alliance, and the like. Some or all communication protocol processing of data from SDP logic 132—e.g. including link layer processing and/or physical (PHY) layer processing—may be provided, for example, by connectivity logic 134 or other logic of middleware 130. Based on such communication protocol processing, platform 110 may exchange signals to communicate to another device—e.g. the illustrative platform 150—information including the processed sensor data generated by SDP logic 132.

Platform 150 may provide functionality which, in one or more respects, is inverse to some or all of that which is provided by platform 110. For example, a software stack of platform 150 may be implemented with a host OS which comprises OS kernel 166, where the host OS supports execution of one or more applications in an application layer of the stack. An example of one such application is represented by the illustrative user application 164. The software stack of platform 150 may further comprise middleware 170 which, for example, may receive and process sensor data provided by platform 110.

By way of illustration and not limitation, platform 150 may comprise an antenna 178 to receive signals transmitted from platform 110. Under control by a diver process such as the illustrative I/O device driver 162, network I/O hardware 176 may provide the received signals to a communication protocol stack (not shown) for receiver processing according to a particular communication protocol. Although certain embodiments are not limited in this regard, such a communication protocol stack may be implemented at least in part with middleware 170 of platform 150—e.g. with connectivity logic 174 having some or all of the features of connectivity logic 134.

Processing of the received signals by the communication protocol stack may include, for example, reconstructing sensor data from multiple network packets exchanged between antennas 138, 178. For example, sensor data packets may be reconstructed by connectivity logic 174 and then sent to SDP logic 172 for further processing. Sensor data packet processing by SDP logic 172 may be inverse, in one or more respects, to that which is provided by SDP logic 132. In an embodiment, SDP logic 172 identifies a portion of a packet as including sensor data—e.g. by evaluating a header/tail portion or portions of the packet. SDP logic 172 may then extract such payload sensor data and, for example, perform one or more operations based on the extracted data to generate information to be communicated to user application 162.

In one embodiment, SDP logic 172 performs operations to convert extracted sensor data to provide to user application 160 a simulation of an operation as having taken place at or with platform 150. For example, SDP logic 172 may receive motion sensor data indicating that platform 110 has been moved in a particular direction or directions. Such motion sensor data may be converted by SDP logic 172 into data which is subsequently presented to user application 164 as sensor data representing motion of platform 150. Alternatively or in addition, motion sensor data may be converted into data to be presented to user application 164 as representing user input—e.g. one or more keystrokes—at a user I/O device (not shown) of platform 150. Any of various other types of sensor data conversion may be additionally or alternatively performed by SDP logic 172, according to different embodiments.

Figure 2:
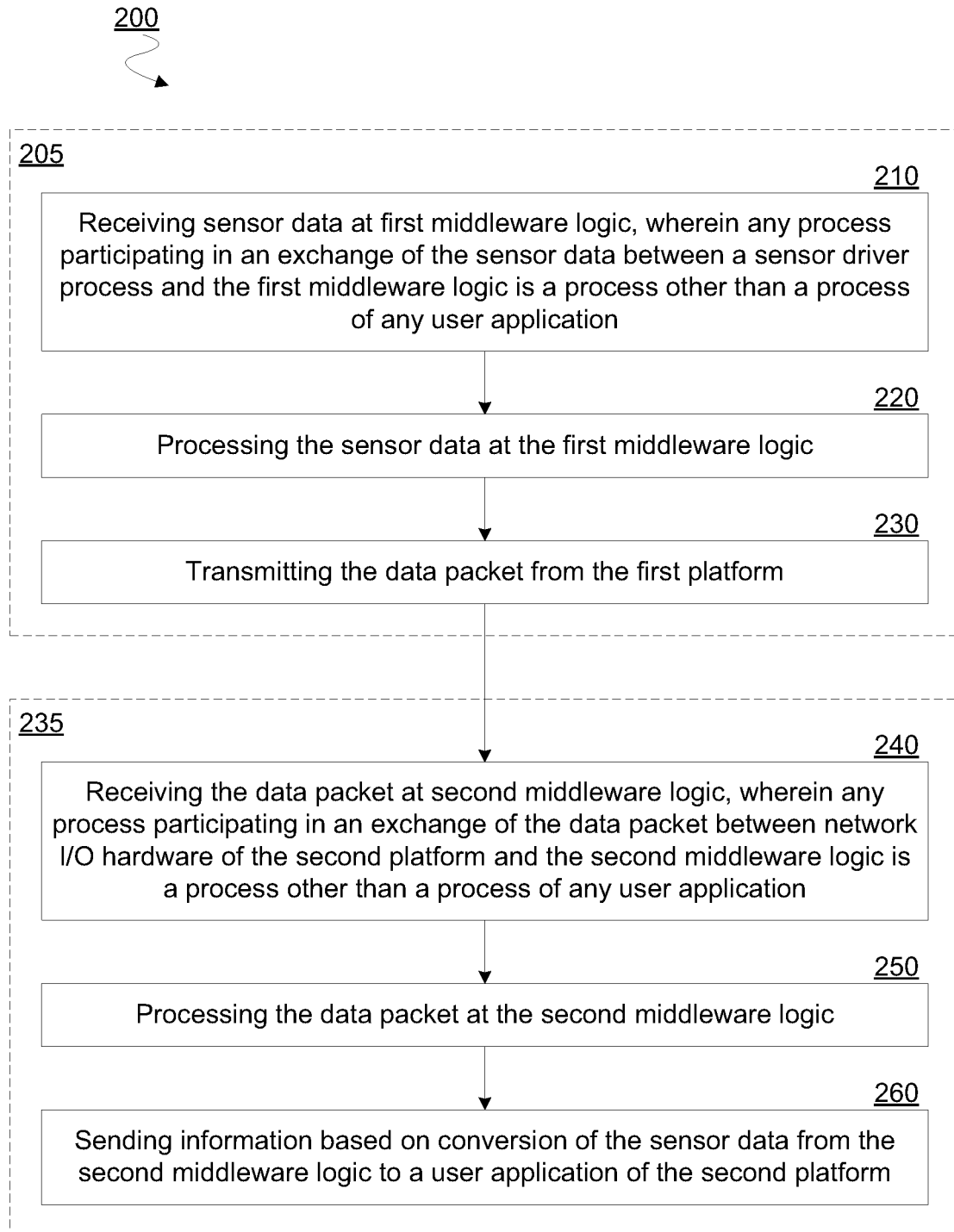
FIG. 2 is a flow diagram illustrating elements of a method for communicating sensor data according to an embodiment.

FIG. 2 illustrates elements of the method 200 for communicating sensor information according to an embodiment. Method 200 may be performed, for example, by one or more devices having some or all of the features of system 100. By way of illustration and not limitation, method 200 may comprise operations 205 performed by a transmitter platform such as platform 110. Alternatively or in addition, method 200 may comprise operations 235 performed by a receiver platform such as platform 150.

In an embodiment, operations 205 include, at 210, receiving sensor data at first middleware logic of a first (e.g. receiver) platform. The first middleware logic may provide some or all of the functionality of SDP logic 132, for example. The sensor data may be provided by a sensor driver process of the first platform based on operation of a sensor device of the first platform. The exchange of sensor data may be performed independent of any user application executing during the exchange. In such an embodiment, any process participating in the exchange of the sensor data between the sensor driver process and the first middleware logic is a process other than a process of any user application.

Operations 205 may further comprise, at 220, processing the sensor data at the first middleware logic. The processing of sensor data at 220 may generate a data packet, also referred to as a sensor data packet, including processed sensor data. In this particular context, the term "processed sensor data" refers to data generated based on formatting, converting, mathematical calculating and/or other such processing which operates on the sensor data received by the middleware logic.

For example, processing of sensor data at 220 may include formatting data values—e.g. variously representing one or more points, vectors, matrices and/or other data instances which each represent a respective one or more sensed conditions values. Although certain embodiments are not limited in this regard, such formatting may generate a string of such data values, wherein the values are variously separated by predetermined characters (e.g. commas ",") which another platform will recognize as distinguishing sensor data values from one another.

Alternatively or in addition, the processing at 220 may include converting sensor data from one unit of measurement to another unit of measurement. Alternatively or in addition, the processing at 220 may include calculating based on multiple sensor data values one or more of a median value, an average value (e.g., a moving window average), an integral value, a first-order differential value, a second-order differential value and/or the like. Certain embodiments or not limited with respect to a particular type of mathematical operations which may be performed by the first middleware logic based on the sensor data.

In various documents, processing at 220 may include evaluating recently received sensor data to determine whether (or not) the relatively new sensor data is to be communicated—e.g. including determining whether relatively older sensor data is to be reused instead. For example, newer sensor data may be compared at 220 to sensor data which was received earlier in time by the first middleware logic. Based on such comparison, a determination may be made as to whether the older sensor data is to be resent from the first platform. In some embodiments, the reuse of older sensor data may be indicated by sending a dedicated character or characters—rather than the older sensor data itself—which are predetermined as being indicative of the reuse of previously communicated sensor data. Such techniques for reusing comparatively old sensor data may allow for a reduction in apparent sensor jitter and/or improved channel utilization for inter-platform communication.

After processing of the sensor data at 220, operations 205 may perform, at 230, transmitting the data packet from the first platform. The transmitting at 230 may include sending the sensor data packet for additional processing by a communication protocol stack of the first platform.

In an embodiment, operations 235 include, at 240, receiving the data packet at second middleware logic of the second platform. The second middleware logic may include some or all of the features of SDP logic 172, for example. By way of illustration and not limitation, the data packet transmitted at 230 may be received by network I/O hardware of the second platform for receive processing by a communication protocol stack of the second platform. Such receive processing may include reconstituting the sensor data packet from one or more network packets received by the network I/O hardware. The sensor data packet may be provided to the second middleware logic independent of any application executing at the second platform. In such an embodiment, any process participating in an exchange of the sensor data packet between network I/O hardware and the second middleware logic of the second platform is a process other than a process of any user application.

Operations 235 may further comprise, at 250, processing the data packet at the second middleware logic. The processing at 250 may include, for example, operations to extract the sensor data from the sensor data packet and to perform a conversion of the extracted sensor data. These operations may include evaluating headers/tail portions of the sensor data packet to identify a format type of the sensor data. Alternatively or in addition, these operations may include identifying whether one or more sensor data values are to be reused—e.g. repeated in a sequence of sensor data values. Conversion of the extracted sensor data may include, for example, calculating based on multiple sensor data values one or more of a median value, an average value, an integral value, a differential value and/or the like.

In an embodiment, operations 235 further comprise, at 260, sending information which is based on conversion of the sensor data at 250 from the second middleware logic to a user application of the second platform. The information sent at 260 may simulate to the user application an action taken by or with the second platform. For example, such information may be represented to the user application as being one or more inputs provided by a user of the second platform. In response to such simulation, the user application of the second platform may provide some output via a graphical user interface, speaker, a haptic (e.g. vibration) device and/or other such output mechanism of the second platform.

Figure 3:
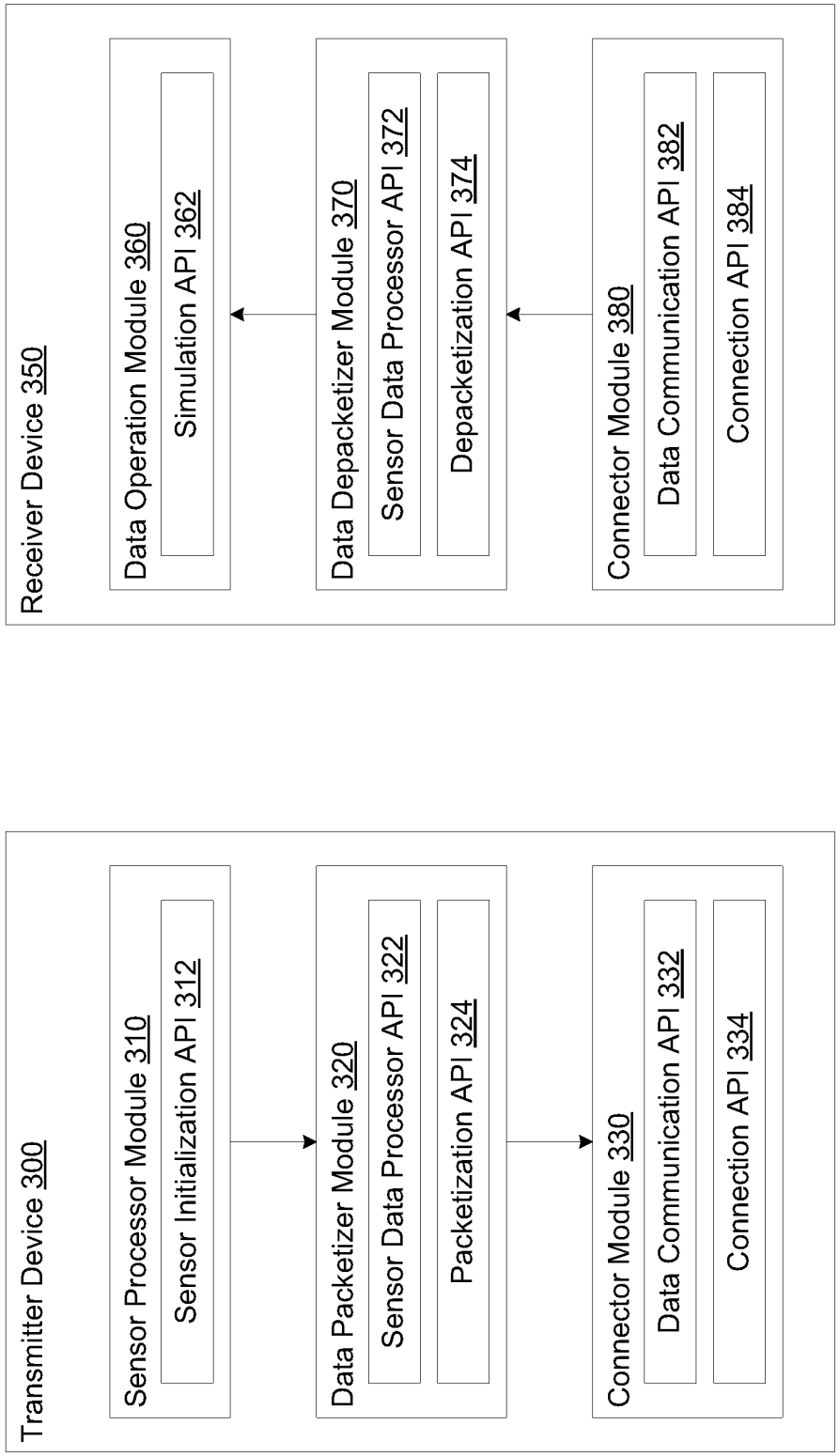
FIG. 3A is a functional block diagram illustrating elements of a device for transmitting sensor data according to an embodiment.
FIG. 3B is a functional block diagram illustrating elements of a device for receiving sensor data according to an embodiment.

FIG. 3A illustrates elements of a transmitter device 300 for generating and transmitting sensor data according to an embodiment. Transmitter device 300 may include some or all of the features of platform 110, for example. More particularly, FIG. 3A shows features of logic such as that provided by middleware 130.

Software resources of transmitter device 300 may include one or more of a sensor processor module 310, a data packetizer module 320 and a connector module 330. Sensor processor module 310 may provide functionality, such as that of sensor driver 122, to drive one or more sensors (not shown) of transmitter device 300. Sensor processor module 310 may include a sensor initialization API 312 to be made available to one or more user applications and/or to middleware logic of transmitter device 300. Sensor initialization API 312 may provide for configuration of sensor processor module 310—e.g. to define a condition or conditions defining whether/when a sensor (not shown) of transmitter device 300 is to begin, or stop, sensing operations.

Data packetizer module 320 may provide functionality such as that of SDP logic 132. In an embodiment, data packetizer module 320 includes a sensor data processor API 322 and/or a packetization API 324. Sensor data processor API 322 may provide for access to data packetizer module 320 for defining or otherwise indicating operations to convert, format, calculate and/or otherwise process sensor data. Packetization API 324 may provide for access to data packetized module 320 to specify a packet structure, metadata format and/or other information to be used in packetizing sensor data.

Connector module 330 may include some or all of the features of connectivity logic 134. For example, connector module 330 may provide automatic proximity detection and connection functionality such as that provided by CCF technology of Intel Corporation. A data communication API 332 of connector module 330 may be available to a user application and/or middleware of transmitter device 300— e.g. to provide for configuration of connector module 330 for a particular communication protocol and/or one or more operational parameters of such a communication protocol. Alternatively or in addition, a connection API 334 of connector module 330 may provide for configuration of automated operations to establish a communication channel between transmitter device 300 and another platform—e.g. the illustrative receiver device 350 of FIG. 3B. In one embodiment, a single platform includes both features of transmitter device 300 and features of receiver device 350.

FIG. 3B illustrates elements of a receiver device 350 for receiving and processing sensor data according to an embodiment. Receiver device 350 may include some or all of the features of platform 150, for example. More particularly, FIG. 3B shows features of software logic such as that provided by middleware 170.

Software resources of receiver device 350 may include one or more of a data operation module 360, a data depacketizer module 370 and a connector module 380. Connector module 380 may provide receive communication protocol functionality—such as that of connectivity logic 174— which is, in one or more respects, inverse to transmit functionality provided by connector module 330. For example, a connection API 384 of connector module 380 may provide for configuration of automated platform detection/connection functionality, and a data communication API 382 of connector module 380 may provide for configuration of a particular communication protocol and/or operational parameters of the communication protocol.

Data depacketizer module 370 may provide functionality such as that of SDP logic 172, for example. In an embodiment, a depacketization API 374 may provide the specifying of a packet structure, metadata format and/or other information to be used in depacketizing sensor data provided via connector module 380. A sensor data processor API 372 may allow for the defining of mathematical, formatting, conversion and/or other operations to be performed on the depacketized sensor data.

Data operation module 360 may provide functionality to provide simulation to a user application (not shown) executing at an application layer of receiver device 350. By way of illustration and not limitation, a simulation API 362 of data operation module 360 may provide for configuration of data operation module 360 for simulation of user input (e.g. keystrokes at a touchscreen, keyboard or other user I/O mechanism of receiver device 350) based on sensor data provided by a transmitter device. For example, data operation module 360 may provide for mapping of sensed conditions at another device—e.g. rotation, linear movement, etc. at transmitter device 300—to local keyboard action ('left,' 'right,' 'up,' 'down' or other key pressing) at receiver device 350. Based on such mapping, a user may be able to play keyboard-based games via remote sensor control, enriching the gaming experience. Such simulation functionality may provide for automation at a middleware level of functionality to convert existing keyboard-based gaming applications to sensor-based gaming. Consequently, this middleware-based processing of sensor data eases game (or other application) development and allows for gaming models to be extended.

Figure 4:
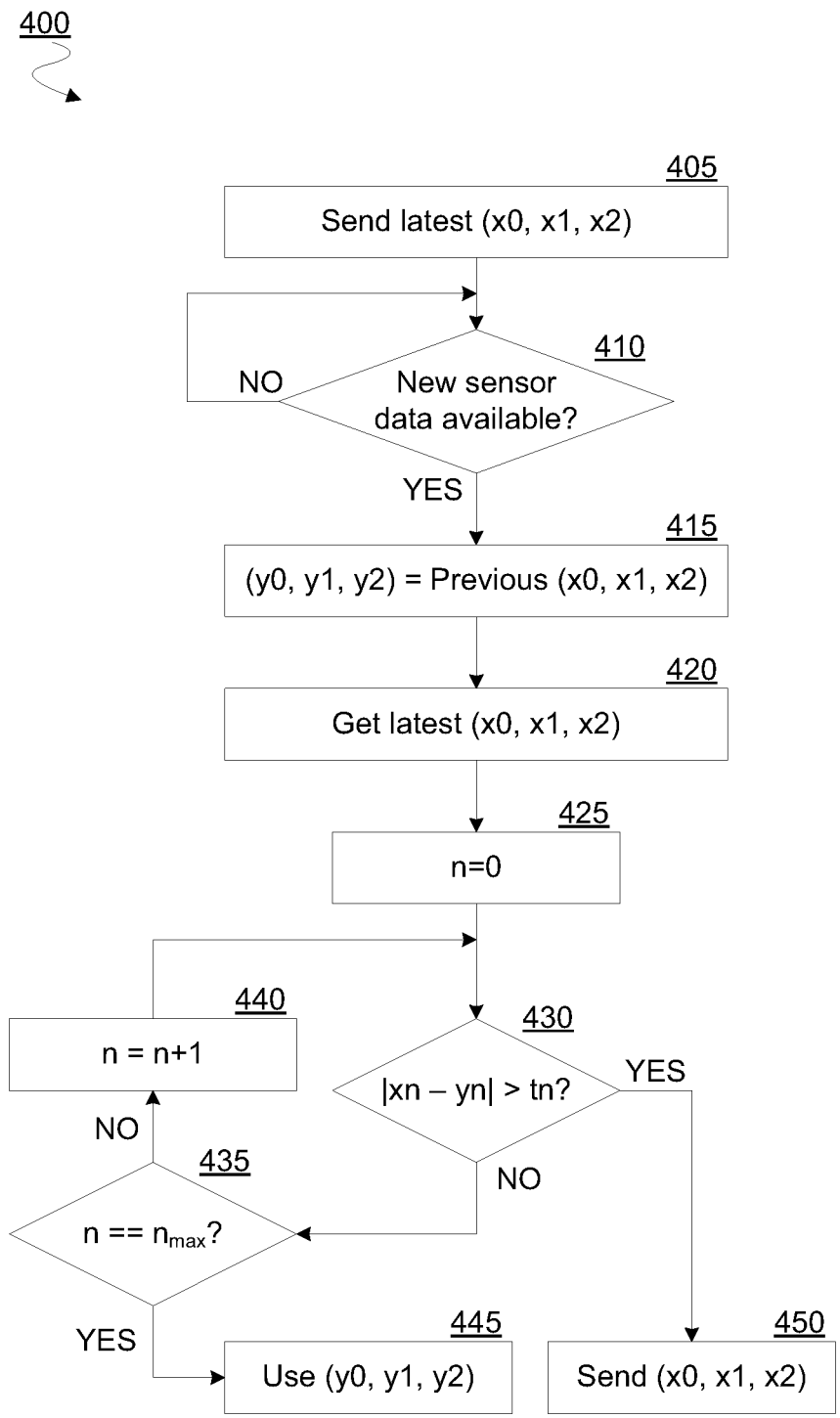
FIG. 4 is a functional block diagram illustrating elements of a device for processing received sensor data according to an embodiment.

FIG. 4 illustrates elements of the method 400 for processing sensor data with middleware according to an embodiment. Method 400 may be performed by middleware such as that which provides functionality of SDP logic 132 and/or functionality of SDP logic 172. For example, method 400 may include some or all of the processing at 220 of operations 205 and/or some or all of the processing at 250 of operations 235.

Method 400 may successively operate on groups of sensor data which, with respect to one another, are received by the middleware in sequence over time. Such data groups may each comprise a respective m parameter values (where m is some positive integer) representing linear motion, rotational motion, sound, pressure, temperature and/or some other sensed condition. By way of illustration and not limitation, method 400 may, at 405, send a latest (e.g. most recently received) group of values for condition parameters (x0, x1, x2)—i.e. where m is equal to three in this scenario. The parameters (x0, x1, x2) may represent, for example, components for a vector of motion, velocity or acceleration in a three-dimensional space. In an embodiment, the sending at 405 includes sending the data values for processing by a communication protocol stack or by a user application.

After the sending at 405, method 400 may, at 410, determine whether new sensor data is available. The determining at 410 may be performed repeatedly until new sensor data is identified. In response to detecting new sensor data at 410, method 400 may set m placeholder variables—as represented by the illustrative variables (y0, y1, y2)—each to be equal to a respective one of the preceding m values for the data group. Method 400 may then get the latest m values for the parameters, as shown at 420 for (x0, x1, x2).

In an embodiment, method 400 performs operations to compare more recent values for parameters (x0, x1, x2) with a comparatively older group of such parameter values. Based on such comparison, method 400 may determine whether or not forego communication of the more recent parameter values—e.g. to reduce apparent sensor jitter and/or to improve inter-platform channel utilization.

By way of illustration and not limitation, method 400 may, at 425, set a counter variable n equal to zero. The counter value n may be successively incremented—e.g. at 440—for each of one or more iterations to variously evaluate, at 430, whether a difference between x0 and y0 is greater than some threshold value t0, whether a difference between x1 and y1 is greater than some threshold value t1 or whether a difference between x2 and y2 is greater than some threshold value t2. Such threshold values t0, t1, t2 may be provided as a priori values which depend upon implementation-specific details, and which are not limiting on certain embodiments. The iterative evaluations at 430 may end if it is determined at one such iteration that a threshold difference has been exceeded (and/or in some embodiments, met), or if it is determined, at 435, that all m parameters have been evaluated.

If any of the threshold conditions is met for (x0, x1, x2) at 430, then a difference between the latest values for (x0, x1, x2) is sufficiently large, as compared to the preceding values (y0, y1, y2), to warrant communication of the latest values. Accordingly, method 400 may, in response to a threshold difference being exceeded (or met, in some embodiments), send the latest values for (x0, x1, x2), as shown at 450. If all m parameters have been evaluated without any such threshold condition being exceeded (or met), then method 400 may, at 445, determine that the previous parameter values—currently stored in variables (y0, y1, y2)—are to be reused. For example, the reusing at 445 may include the middleware resending to a communication protocol stack or user application the previously-sent values for parameters (x0, x1, x2). Alternatively, the reusing at 445 may include the middleware sending a signal or signals, other than the previously-sent parameter values, which a receiving middleware process or user application is to recognize as indicating that the previously-sent values are to be reused as current values for the parameters (x0, x1, x2). In still another embodiment, the reusing at 445 may include the middleware simply foregoing the transmission of new values for parameters (x0, x1, x2)—e.g. where a receiving user application will recognize the absence of new parameter values as indicating that the previously-sent values are to be reused in a sequence of values for the parameters.

Figure 5:
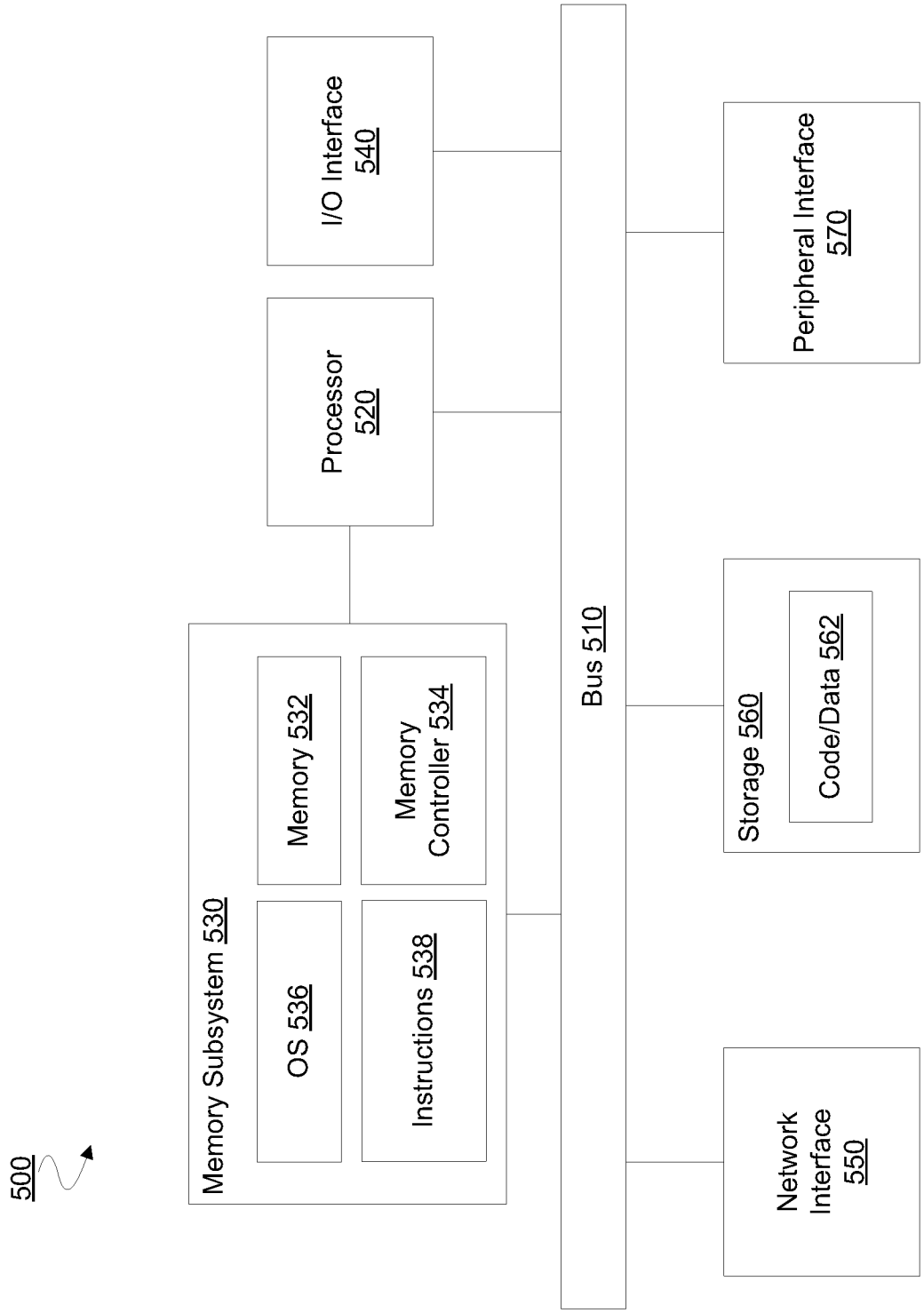
FIG. 5 is a functional block diagram illustrating elements of a computer system for exchanging sensor information according to an embodiment.

FIG. 5 is a block diagram of an embodiment of a computing system with which sensor information may be communicated. System 500 represents a computing device in accordance with any embodiment described herein, and may be a laptop computer, a desktop computer, a server, a gaming or entertainment control system, or other electronic device. System 500 may include processor 520, which provides processing, operation management, and execution of instructions for system 500. Processor 520 may include any type of microprocessor, central processing unit (CPU), processing core, or other processing hardware to provide processing for system 500. Processor 520 controls the overall operation of system 500, and may be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 530 represents the main memory of system 500, and provides temporary storage for code to be executed by processor 520, or data values to be used in executing a routine. Memory subsystem 530 may include one or more memory devices such as read-only memory (ROM), flash memory, one or more varieties of random access memory (RAM), or other memory devices, or a combination of such devices. Memory subsystem 530 stores and hosts, among other things, operating system (OS) 536 to provide a software platform for execution of instructions in system 500. Additionally, other instructions 538 are stored and executed from memory subsystem 530 to provide the logic and the processing of system 500. OS 536 and instructions 538 are executed by processor 520.

Memory subsystem 530 may include memory device 532 where it stores data, instructions, programs, or other items—e.g. for middleware and one or more user applications (not shown) executing with OS 536. In one embodiment, memory subsystem includes memory controller 534, which is a memory controller in accordance with any embodiment described herein, and which provides mechanisms for accessing memory device 532. In one embodiment, memory controller 534 provides commands to access memory device 532.

Processor 520 and memory subsystem 530 are coupled to bus/bus system 510. Bus 510 is an abstraction that represents any one or more separate physical buses, communication lines/interfaces, and/or point-to-point connections, connected by appropriate bridges, adapters, and/or controllers. Therefore, bus 510 may include, for example, one or more of a system bus, a Peripheral Component Interconnect (PCI)

bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 510 may also correspond to interfaces in network interface 550.

System 500 may also include one or more input/output (I/O) interface(s) 540, network interface 550, one or more internal mass storage device(s) 560, and peripheral interface 570 coupled to bus 510. I/O interface 540 may include one or more interface components through which a user interacts with system 500 (e.g., video, audio, and/or alphanumeric interfacing). Network interface 550 provides system 500 the ability to communicate with remote devices (e.g., servers, other computing devices) over one or more networks. Network interface 550 may include an Ethernet adapter, wireless interconnection components, USB (universal serial bus), or other wired or wireless standards-based or proprietary interfaces.

Storage 560 may be or include any conventional medium for storing large amounts of data in a nonvolatile manner, such as one or more magnetic, solid state, or optical based disks, or a combination. Storage 560 holds code or instructions and data 562 in a persistent state (i.e., the value is retained despite interruption of power to system 500). Storage 560 may be generically considered to be a "memory," although memory 530 is the executing or operating memory to provide instructions to processor 520. Whereas storage 560 is nonvolatile, memory 530 may include volatile memory (i.e., the value or state of the data is indeterminate if power is interrupted to system 500).

Peripheral interface 570 may include any hardware interface not specifically mentioned above. Peripherals refer generally to devices that connect dependently to system 500. A dependent connection is one where system 500 provides the software and/or hardware platform on which an operation executes, and with which a user interacts. Although certain embodiments are not limited in this regard, one or more sensors (not shown) of system 500 may be coupled to bus 510—e.g. via peripheral interface 570.

Figure 6:
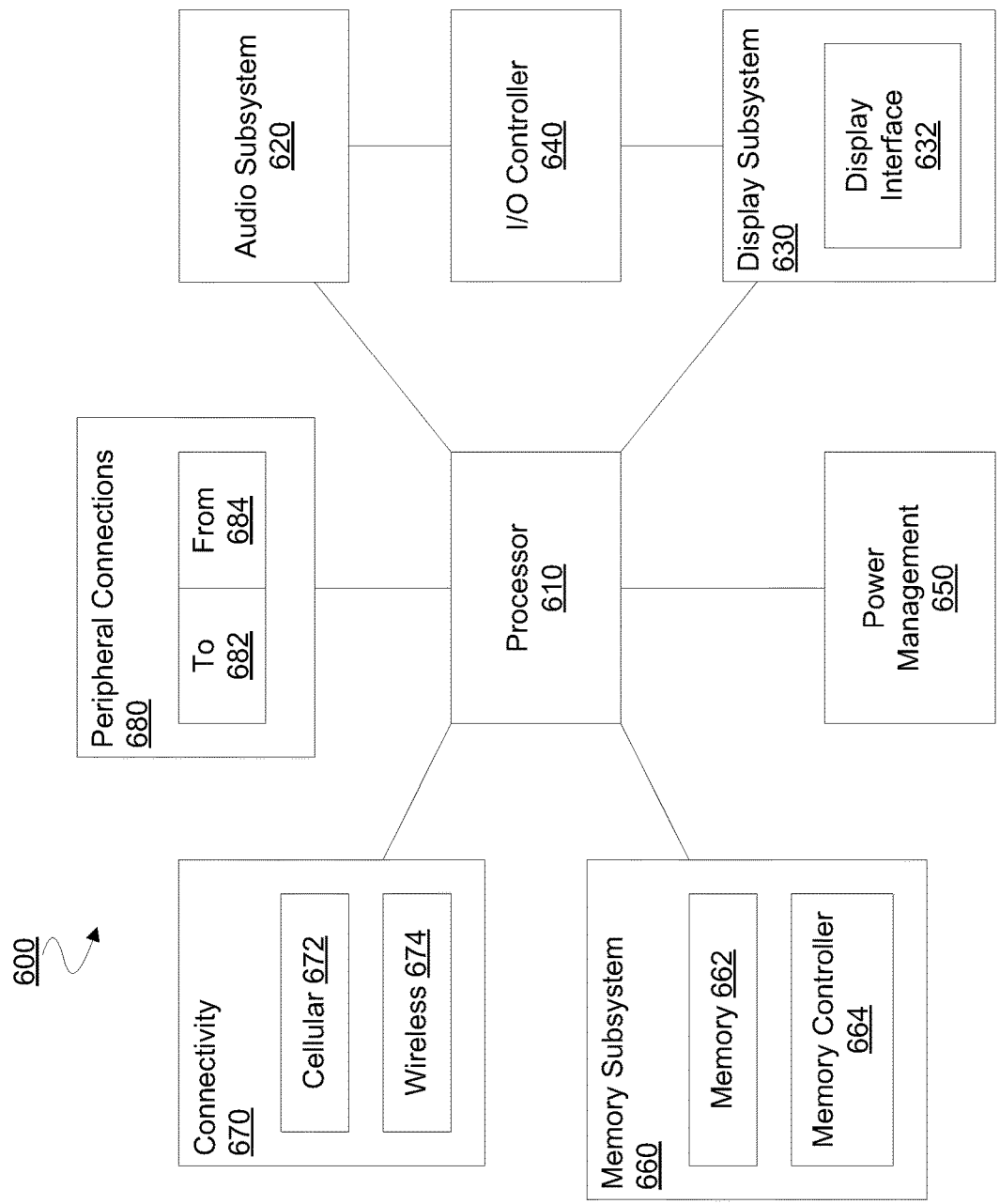
FIG. 6 is a functional block diagram illustrating elements of a mobile device for exchanging sensor information according to an embodiment.

FIG. 6 is a block diagram of an embodiment of a mobile device with which sensor information may be communicated. Device 600 represents a mobile computing device, such as a computing tablet, a mobile phone or smartphone, a wireless-enabled e-reader, or other mobile device. It will be understood that certain of the components are shown generally, and not all components of such a device are shown in device 600.

Device 600 may include processor 610, which performs the primary processing operations of device 600. Processor 610 may include one or more physical devices, such as microprocessors, application processors, microcontrollers, programmable logic devices, or other processing means. The processing operations performed by processor 610 include the execution of an operating platform or operating system on which applications and/or device functions are executed. The processing operations include operations related to I/O (input/output) with a human user or with other devices, operations related to power management, and/or operations related to connecting device 600 to another device. The processing operations may also include operations related to audio I/O and/or display I/O.

In one embodiment, device 600 includes audio subsystem 620, which represents hardware (e.g., audio hardware and audio circuits) and software (e.g., drivers, codecs) components associated with providing audio functions to the computing device. Audio functions may include speaker and/or headphone output, as well as microphone input. Devices for such functions may be integrated into device 600, or connected to device 600. In one embodiment, a user interacts with device 600 by providing audio commands that are received and processed by processor 610.

Display subsystem 630 represents hardware (e.g., display devices) and software (e.g., drivers) components that provide a visual and/or tactile display for a user to interact with the computing device. Display subsystem 630 may include display interface 632, which may include the particular screen or hardware device used to provide a display to a user. In one embodiment, display interface 632 includes logic separate from processor 610 to perform at least some processing related to the display. In one embodiment, display subsystem 630 includes a touchscreen device that provides both output and input to a user.

I/O controller 640 represents hardware devices and software components related to interaction with a user. I/O controller 640 may operate to manage hardware that is part of audio subsystem 620 and/or display subsystem 630. Additionally, I/O controller 640 illustrates a connection point for additional devices that connect to device 600 through which a user might interact with the system. For example, devices that may be attached to device 600 might include microphone devices, speaker or stereo systems, video systems or other display device, keyboard or keypad devices, or other I/O devices for use with specific applications such as card readers or other devices.

As mentioned above, I/O controller 640 may interact with audio subsystem 620 and/or display subsystem 630. For example, input through a microphone or other audio device may provide input or commands for one or more applications or functions of device 600. Additionally, audio output may be provided instead of or in addition to display output. In another example, if display subsystem includes a touchscreen, the display device also acts as an input device, which may be at least partially managed by I/O controller 640. There may also be additional buttons or switches on device 600 to provide I/O functions managed by I/O controller 640.

In one embodiment, I/O controller 640 manages devices such as accelerometers, cameras, light sensors or other environmental sensors, gyroscopes, global positioning system (GPS), or other hardware that may be included in device 600. The input may be part of direct user interaction, as well as providing environmental input to the system to influence its operations (such as filtering for noise, adjusting displays for brightness detection, applying a flash for a camera, or other features).

In one embodiment, device 600 includes power management 650 that manages battery power usage, charging of the battery, and features related to power saving operation. Memory subsystem 660 may include memory device(s) 662 for storing information in device 600. Memory subsystem 660 may include nonvolatile (state does not change if power to the memory device is interrupted) and/or volatile (state is indeterminate if power to the memory device is interrupted) memory devices. Memory 660 may store middleware code and/or other data, application data, user data, music, photos, documents, or other data, as well as system data (whether long-term or temporary) related to the execution of the applications and functions of system 600. In one embodiment, memory subsystem 660 includes memory controller 664 (which could also be considered part of the control of system 600, and could potentially be considered part of processor 610) to control memory 662.

Connectivity 670 may include hardware devices (e.g., wireless and/or wired connectors and communication hardware) and software components (e.g., drivers, protocol stacks) to enable device 600 to communicate with external devices. The device could be separate devices, such as other computing devices, wireless access points or base stations, as well as peripherals such as headsets, printers, or other devices.

Connectivity 670 may include multiple different types of connectivity. To generalize, device 600 is illustrated with cellular connectivity 672 and wireless connectivity 674. Cellular connectivity 672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 674 refers to wireless connectivity that is not cellular, and may include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 680 include hardware interfaces and connectors, as well as software components (e.g., drivers, protocol stacks) to make peripheral connections. It will be understood that device 600 could both be a peripheral device ("to" 682) to other computing devices, as well as have peripheral devices ("from" 684) connected to it. Device 600 commonly has a "docking" connector to connect to other computing devices for purposes such as managing (e.g., downloading and/or uploading, changing, synchronizing) content on device 600. Additionally, a docking connector may allow device 600 to connect to certain peripherals that allow device 600 to control content output, for example, to audiovisual or other systems. Although certain embodiments are not limited in this regard, one or more sensors (not shown) of device 600 may be coupled to processor 610—e.g. each via a respective "from" connection 684.

In addition to a proprietary docking connector or other proprietary connection hardware, device 600 may make peripheral connections 680 via common or standards-based connectors. Common types may include a Universal Serial Bus (USB) connector (which may include any of a number of different hardware interfaces), DisplayPort including MiniDisplayPort (MDP), High Definition Multimedia Interface (HDMI), Firewire, or other type.

In one implementation, a method comprises receiving, at first middleware logic, sensor data from a sensor driver process, the first middleware logic executing with a processor and a memory of a first platform, the sensor data generated based on operation of a sensor device of the first platform, wherein any process participating in an exchange of the sensor data between the sensor driver process and the first middleware logic is a process other than a process of any user application. The method further comprises performing processing of the sensor data at the first middleware logic, including the first middleware logic generating a data packet including information based on the sensor data, and transmitting the data packet from the first platform.

In an embodiment, transmitting the data packet comprises, after the processing of the sensor data at the first middleware logic, sending the data packet from the first middleware logic to a communication protocol stack of the first platform. In another embodiment, receiving the sensor data at the first middleware logic comprises receiving a first value for a parameter of a condition sensed by the sensor device, and after receiving the first value, receiving a second value for the parameter, wherein processing of the sensor data at the first middleware logic comprises performing a comparison based on the first value and the second value, and, based on the comparison, determining whether to communicate the second value after a first communication of the first value. In another embodiment, determining whether to communicate the second value includes determining whether to perform a second communication of the first value in lieu of a communication of the second value.

In another embodiment, the method further comprises, at the first middleware logic, receiving from a first user application of the first platform a signal indicating one or more conditions, and in response to receiving the signal, evaluating whether the one more conditions have been met, and based on the evaluating, determining that the first middleware logic is to automatically commence sensor data processing. In another embodiment, the one or more conditions includes a detection of a second platform. In another embodiment, the sensor device comprises a motion sensor.

In another implementation, a computer-readable storage medium has stored thereon instructions which, when executed by one or more processing units, cause the one or more processing units to perform a method comprising receiving, at first middleware logic, sensor data from a sensor driver process, the first middleware logic executing with a processor and a memory of a first platform, the sensor data generated based on operation of a sensor device of the first platform, wherein any process participating in an exchange of the sensor data between the sensor driver process and the first middleware logic is a process other than a process of any user application. The method further comprises performing processing of the sensor data at the first middleware logic, including the first middleware logic generating a data packet including information based on the sensor data, and transmitting the data packet from the first platform.

In an embodiment, transmitting the data packet comprises, after the processing of the sensor data at the first middleware logic, sending the data packet from the first middleware logic to a communication protocol stack of the first platform. In another embodiment, receiving the sensor data at the first middleware logic comprises receiving a first value for a parameter of a condition sensed by the sensor device, and after receiving the first value, receiving a second value for the parameter, wherein processing of the sensor data at the first middleware logic comprises performing a comparison based on the first value and the second value, and based on the comparison, determining whether to communicate the second value after a first communication of the first value. In another embodiment, determining whether to communicate the second value includes determining whether to perform a second communication of the first value in lieu of a communication of the second value.

In another embodiment, the method further comprises, at the first middleware logic, receiving from a first user application of the first platform a signal indicating one or more conditions, and in response to receiving the signal, evaluating whether the one more conditions have been met, and based on the evaluating, determining that the first middleware logic is to automatically commence sensor data processing. In another embodiment, the one or more conditions includes a detection of a second platform. In another embodiment, the sensor device comprises a motion sensor.

In another implementation, a method comprises receiving a data packet at first middleware logic executing with a processor and a memory of a first platform, the data packet provided via network input/output (I/O) hardware of the first platform, wherein any process participating in an exchange of the data packet between the network I/O hardware and the first middleware logic is a process other than a process of any user application. The method further comprises processing the data packet at the first middleware logic, including the first middleware logic extracting the sensor data from the data packet and performing a conversion of the sensor data, and sending information, based on the conversion of the sensor data, from the first middleware logic to a user application of the first platform.

In an embodiment, receiving the data packet at the first middleware logic includes the first middleware logic receiving the data packet from a communication protocol stack of the second platform. In another embodiment, processing the data packet at the first middleware logic comprises performing a comparison based on a first value for a parameter of a sensed condition and a second value for the parameter of the sensed condition, the second value received after the first value, and based on the comparison, determining whether to communicate the second value after a first communication of the first value. In another embodiment, determining whether to communicate the second value includes determining whether to perform a second communication of the first value in lieu of a communication of the second value.

In another embodiment, the method further comprises, at the first middleware logic, receiving from a first user application of the first platform a signal indicating one or more conditions, in response to receiving the signal, evaluating whether the one more conditions have been met, and based on the evaluating, determining that the first middleware logic is to automatically commence sensor data processing. In another embodiment, the one or more conditions includes a detection of a second platform. In another embodiment, the sensor device comprises a motion sensor.

In another implementation, a computer-readable storage medium has stored thereon instructions which, when executed by one or more processing units, cause the one or more processing units to perform a method comprising receiving a data packet at first middleware logic executing with a processor and a memory of a first platform, the data packet provided via network input/output (I/O) hardware of the first platform, wherein any process participating in an exchange of the data packet between the network I/O hardware and the first middleware logic is a process other than a process of any user application. The method further comprises processing the data packet at the first middleware logic, including the first middleware logic extracting the sensor data from the data packet and performing a conversion of the sensor data, and sending information, based on the conversion of the sensor data, from the first middleware logic to a user application of the first platform.

In an embodiment, receiving the data packet at the first middleware logic includes the first middleware logic receiving the data packet from a communication protocol stack of the second platform. In another embodiment, processing the data packet at the first middleware logic comprises performing a comparison based on a first value for a parameter of a sensed condition and a second value for the parameter of the sensed condition, the second value received after the first value, and based on the comparison, determining whether to communicate the second value after a first communication of the first value. In another embodiment, determining whether to communicate the second value includes determining whether to perform a second communication of the first value in lieu of a communication of the second value.

In another embodiment, the method further comprises, at the first middleware logic, receiving from a first user application of the first platform a signal indicating one or more conditions, and in response to receiving the signal, evaluating whether the one more conditions have been met, and based on the evaluating, determining that the first middleware logic is to automatically commence sensor data processing. In another embodiment, the one or more conditions includes a detection of a second platform. In another embodiment, the sensor device comprises a motion sensor.

Techniques and architectures for communicating sensor information are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A method comprising:
   receiving, at first middleware logic of a first platform, sensor data from a sensor driver process, the first middleware logic executing with a processor and a memory of the first platform, the sensor data generated based on operation of a sensor device of the first platform, wherein a sensor driver process associated with the first sensor device provides the sensor data to the first middleware logic independent of a process of any user application;
   performing processing of the sensor data at the first middleware logic, including the first middleware logic generating a data packet including information based on the sensor data, wherein the processing includes determining whether to provide the received sensor data to a second platform and, in response to determining that the received sensor data is not to be provided to the second platform, the information in the data packet comprises a representation of previously processed sensor data, otherwise the information in the data packet comprises a representation of the received sensor data;
   providing the data packet to a communication protocol stack of the first platform that is distinct from the first middleware logic, for transmission of the data packet to the second platform; and
   transmitting the data packet from the first platform to the second platform.

2. The method of claim 1, wherein the representation of previously processed sensor data comprises one or more characters indicating that previously processed and transmitted sensor data is to be reused by the second platform.

3. The method of claim 1, wherein receiving the sensor data at the first middleware logic comprises:
   receiving a first value for a parameter of a condition sensed by the sensor device; and
   after receiving the first value, receiving a second value for the parameter; and
   wherein processing of the sensor data at the first middleware logic comprises:
   performing a comparison based on the first value and the second value; and
   based on the comparison, determining whether to communicate the second value after a first communication of the first value.

4. The method of claim 1, wherein determining whether to communicate the received sensor data to the second platform comprises determining that a value of the received sensor data is greater than a corresponding value of the previously processed sensor data by at least a threshold amount.

5. The method of claim 1, wherein processing the sensor data comprises at least one of calculating an integral or a derivative of the sensor data with respect to previously received sensor data.

6. The method of claim 1, wherein the first middleware logic comprises connectivity logic that is configured to detect the presence of the second platform and the first middleware logic is configured to automatically begin providing sensor data packets to the communication protocol stack for transmission to the second platform in response to detecting the presence of the second platform, wherein the first platform and second platform are both devices of a same user.

7. The method of claim 1, wherein the sensor device comprises a motion sensor.

8. A non-transitory computer-readable storage medium having stored thereon instructions which, when executed by one or more processing units, cause the one or more processing units to perform a method comprising:
   receiving, at first middleware logic of a first platform, sensor data from a sensor driver process, the first middleware logic executing with a processor and a memory of the first platform, the sensor data generated based on operation of a sensor device of the first platform, wherein a sensor driver process associated with the first sensor device provides the sensor data to the first middleware logic independent of a process of any user application;
   performing processing of the sensor data at the first middleware logic, including the first middleware logic generating a data packet including information based on the sensor data, wherein the processing includes determining whether to provide the received sensor data to a second platform and, in response to determining that the received sensor data is not to be provided to the second platform, the information in the data packet comprises a representation of previously processed sensor data, otherwise the information in the data packet comprises a representation of the received sensor data;
   providing the data packet to a communication protocol stack of the first platform that is distinct from the first middleware logic, for transmission of the data packet to the second platform; and
   transmitting the data packet from the first platform to the second platform.

9. The non-transitory computer-readable storage medium of claim 8, wherein the representation of previously processed sensor data comprises one or more characters indicating that previously transmitted sensor data is to be reused.

10. The non-transitory computer-readable storage medium of claim 8, wherein receiving the sensor data at the first middleware logic comprises:
    receiving a first value for a parameter of a condition sensed by the sensor device; and
    after receiving the first value, receiving a second value for the parameter; and wherein processing of the sensor data at the first middleware logic comprises:
  performing a comparison based on the first value and the second value; and
  based on the comparison, determining whether to communicate the second value after a first communication of the first value.

11. The non-transitory computer-readable storage medium of claim 8, wherein determining whether to provide the received sensor data to the second platform comprises providing the received sensor data to the second platform in response to determining that a value of a parameter of the received sensor data is greater than a value of the parameter of previously received sensor data by at least a threshold amount.

12. The non-transitory computer-readable storage medium of claim 8, wherein the sensor device comprises a motion sensor.

13. A method comprising:
  receiving a data packet of sensor data at first middleware logic executing with a processor and a memory of a first platform, the data packet received from a second platform and provided to the first platform via network input/output (I/O) hardware of the first platform that is distinct from the first middleware logic of the first platform, wherein any process participating in an exchange of the data packet between the network I/O hardware and the first middleware logic is a process other than a process of any user application;
  processing the received data packet of sensor data at the first middleware logic, including the first middleware logic extracting the sensor data of the second platform from the received data packet and performing a conversion of the sensor data, wherein, in response to the extracted sensor data comprising one or more predetermined characters, the conversion is performed using previously received sensor data; and
  sending information, based on the conversion of the sensor data, from the first middleware logic to a user application of the first platform.

14. The method of claim 13, wherein the information comprises a mapping of at least one value of processed sensor data to a local keyboard action of the first platform.

15. The method of claim 13, wherein processing the data packet at the first middleware logic comprises:
  performing a comparison based on a first value for a parameter of a sensed condition and a second value for the parameter of the sensed condition, the second value received after the first value; and
  based on the comparison indicating that the second value for the parameter is at least a threshold amount greater than the first value for the parameter, communicating the second value after a first communication of the first value otherwise performing a second communication of the first value in lieu of a communication of the second value.

16. The method of claim 13, wherein processing the sensor data comprises at least one of computing an integral of the sensor data or a derivative of the sensor data with respect to previously received sensor data.

17. The method of claim 13, further comprising, at the first middleware logic:
  receiving from a first user application of the first platform a signal indicating one or more conditions;
  in response to receiving the signal, evaluating whether the one more conditions have been met; and
  based on the evaluating, determining that the first middleware logic is to automatically commence sensor data processing.

18. The method of claim 13, wherein the first middleware logic comprises connectivity logic that is configured to detect a presence of the second platform and the first middleware is configured to automatically begin obtaining sensor data packets from the first communication protocol stack for processing by the first middleware logic in response to detecting the presence of the second platform, wherein the first and second platforms are both devices of a same user.

19. The method of claim 13, wherein the sensor data comprises data from a motion sensor.

20. A non-transitory computer-readable storage medium having stored thereon instructions which, when executed by one or more processing units, cause the one or more processing units to perform a method comprising:
  receiving a data packet of sensor data at first middleware logic executing with a processor and a memory of a first platform, the data packet received from a second platform and provided to the first platform via network input/output (I/O) hardware of the first platform that is distinct from the first middleware logic of the first platform, wherein any process participating in an exchange of the data packet between the network I/O hardware and the first middleware logic is a process other than a process of any user application;
  processing the received data packet of sensor data at the first middleware logic, including the first middleware logic extracting the sensor data of the second platform from the received data packet and performing a conversion of the sensor data, wherein, in response to the extracted sensor data comprising one or more predetermined characters, the conversion is performed using previously received sensor data; and
  sending information, based on the conversion of the sensor data, from the first middleware logic to a user application of the first platform.

21. The non-transitory computer-readable storage medium of claim 20, wherein the information comprises a mapping of at least one value of processed sensor data to a local keyboard action of the first platform.

22. The non-transitory computer-readable storage medium of claim 20, wherein processing the data packet at the first middleware logic comprises:
  performing a comparison based on a first value for a parameter of a sensed condition and a second value for the parameter of the sensed condition, the second value received after the first value; and
  based on the comparison indicating that the second value for the parameter is at least a threshold amount greater than the first value for the parameter, communicating the second value after a first communication of the first value otherwise performing a second communication of the first value in lieu of a communication of the second value.

23. The non-transitory computer-readable storage medium of claim 20, the method further comprising, at the first middleware logic:
  receiving from a first user application of the first platform a signal indicating one or more conditions;
  in response to receiving the signal, evaluating whether the one more conditions have been met; and
  based on the evaluating, determining that the first middleware logic is to automatically commence sensor data processing.

24. The non-transitory computer-readable storage medium of claim 20, wherein the sensor data comprises data from a motion sensor.

\* \* \* \* \*